United States Patent
Pavanje et al.

(10) Patent No.: US 10,824,316 B2
(45) Date of Patent: Nov. 3, 2020

(54) DYNAMIC INPUT CONTROL CREATION

(71) Applicant: SAP SE, Walldorf (DE)

(72) Inventors: Sudarshan Pavanje, Mangalore (IN);
Ashutosh Rastogi, Bangalore (IN);
Vijaya Pramila, Badvel (IN); Rahul Tiwari, Bangalore (IN); Sujit Ramesh Adichikat, Bangalore (IN); Gowda Timma Ramu, Bangalore (IN)

(73) Assignee: SAP SE, Walldorf (DE)

( * ) Notice: Subject to any disclaimer, the term of this patent is extended or adjusted under 35 U.S.C. 154(b) by 290 days.

(21) Appl. No.: 15/365,080

(22) Filed: Nov. 30, 2016

(65) Prior Publication Data

US 2018/0150210 A1    May 31, 2018

(51) Int. Cl.
| | |
|---|---|
| G06F 3/0484 | (2013.01) |
| G06F 3/0482 | (2013.01) |
| G06F 3/0486 | (2013.01) |
| G06F 9/451 | (2018.01) |
| G06F 16/00 | (2019.01) |

(52) U.S. Cl.
CPC ........ *G06F 3/04847* (2013.01); *G06F 3/0486* (2013.01); *G06F 9/451* (2018.02); *G06F 16/00* (2019.01)

(58) Field of Classification Search
CPC .. G06F 3/04847; G06F 3/0486; G06F 3/0482; G06F 9/451; G06F 16/00
See application file for complete search history.

(56) References Cited

U.S. PATENT DOCUMENTS

| | | | |
|---|---|---|---|
| 2004/0125137 A1* | 7/2004 | Stata | G06Q 10/109 |
| | | | 715/764 |
| 2005/0010901 A1* | 1/2005 | Udler | G06F 9/451 |
| | | | 717/109 |
| 2006/0236254 A1* | 10/2006 | Mateescu | G06F 8/75 |
| | | | 715/762 |
| 2007/0005562 A1* | 1/2007 | Chau | G06F 17/30604 |
| 2011/0246538 A1* | 10/2011 | Boley | G06F 17/30398 |
| | | | 707/805 |
| 2012/0166421 A1* | 6/2012 | Cammert | G06F 16/24565 |
| | | | 707/718 |
| 2012/0246589 A1* | 9/2012 | Wernecke | G06F 3/0481 |
| | | | 715/771 |
| 2012/0254832 A1* | 10/2012 | Aman | G06F 16/24 |
| | | | 717/109 |
| 2015/0066977 A1* | 3/2015 | Wen | G06F 16/24528 |
| | | | 707/769 |

(Continued)

*Primary Examiner* — Arpan P. Savla
*Assistant Examiner* — Parmanand D Patel
(74) *Attorney, Agent, or Firm* — Schwegman Lundberg & Woessner, P.A.

(57) ABSTRACT

An element representing an existing filter can be dragged and dropped into a canvas area. In response to the detection of the dropping of the filter, an input control can be automatically created. The selection of an input control may be based on the type (or dimension) of the filter. Alternatively, an option to create an input control can be presented to the user, wherein only valid input control types for the type of the filter are presented. If a data type of a filter changes such that the type of a corresponding input control is no longer valid, the input control may automatically be modified to a type that is valid for the new data type of the filter.

20 Claims, 9 Drawing Sheets

(56) References Cited

U.S. PATENT DOCUMENTS

2015/0089403 A1* 3/2015 Zhu ................... G06F 8/38
                                                   715/762
2015/0220656 A1* 8/2015 Pandey ............... G06F 16/2423
                                                   707/722

* cited by examiner

| OPERATORS | TEXT BOX | COMBO BOX (RADIO BUTTON) | COMBO BOX (CHECK BOX) | LIST BOX (RADIO BUTTON) | LIST BOX (CHECK BOX) | DATE PICKER (SINGLE VALUE) | DATE PICKER (RANGE) | SINGLE SLIDER | DOUBLE SLIDER |
|---|---|---|---|---|---|---|---|---|---|
| EQUAL TO | T TN D M | T TN | T TN | T TN | T TN | D | NA | TN D | NA |
| NOT EQUALS | T TN D M | T TN | T TN | T TN | T TN | D | NA | TN D | NA |
| > | T TN D M | NA | NA | NA | NA | D | NA | TN D | NA |
| >= | T TN D M | NA | NA | NA | NA | D | NA | TN D | NA |
| < | T TN D M | NA | NA | NA | NA | D | NA | TN D | NA |
| <= | T TN D M | NA | NA | NA | NA | D | NA | TN D | NA |
| CONTAINS | T TN D | NA | NA | NA | NA | NA | NA | NA | NA |
| EXCLUDES | T TN D | NA | NA | NA | NA | NA | NA | NA | NA |
| BETWEEN | T TN D M | NA | NA | NA | NA | NA | D | NA | TN M |
| NOT BETWEEN | T TN D M | NA | NA | NA | NA | NA | D | NA | TN M |

*FIG. 4*

DYNAMIC INPUT CONTROL CREATION

TECHNICAL FIELD

The subject matter disclosed herein generally relates to user interface creation. Specifically, the present disclosure addresses systems and methods to dynamically create input controls.

BACKGROUND

Users create filters to determine subsets of data for use in tables, graphs, and reports. The filters can be connected to user interface elements to allow for modification. For example, the user can create a calendar user interface element to allow for selection of a particular date to use for the filter. Various types of user interface elements may be used such as drop-down lists, combo boxes, text boxes, radio buttons, and check boxes.

BRIEF DESCRIPTION OF THE DRAWINGS

Some embodiments are illustrated by way of example and not limitation in the figures of the accompanying drawings.

FIG. 4 is a table illustrating relationships between operators and user interface elements suitable for dynamic input control creation, according to some example embodiments.

DETAILED DESCRIPTION

Example methods and systems are directed to providing dynamic input control creation. The dynamic input control creation may be implemented in a web browser, a software application, an interactive development environment (IDE), an operating system, or any suitable combination thereof. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Input controls may be created on demand. For example, an element representing an existing filter can be dragged and dropped into a canvas area. In response to the detection of the dropping of the filter, an input control can be automatically created.

The selection of an input control may be optimized. For example, the input control type may be based on the type (or dimension) of the filter. Alternatively, an option to create an input control can be presented to the user, wherein only valid input control types for the type of the filter are presented.

Input controls may be dynamic. For example, if a data type of a filter changes such that the type of a corresponding input control is no longer valid, the input control may automatically be modified to a type that is valid for the new data type of the filter. To illustrate, a filter on a date that is associated with a date-picker input control may be changed to a date-time filter. As a result, the input control may be automatically changed to a date-time picker.

Figure 1:
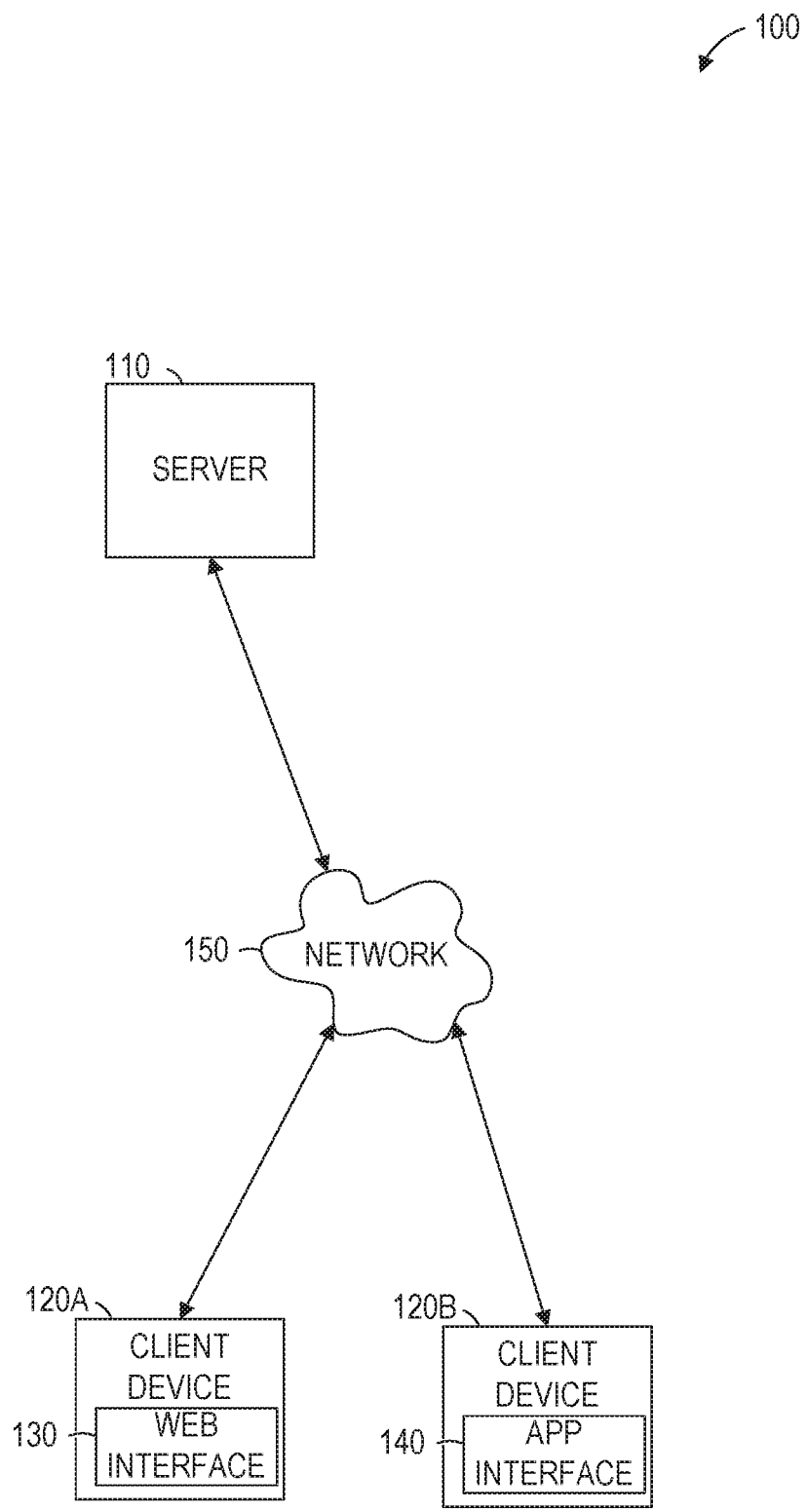
FIG. 1 is a network diagram illustrating a network environment suitable for implementing dynamic input control creation, according to some example embodiments.

FIG. 1 is a network diagram illustrating a network environment 100 suitable for implementing dynamic input control creation, according to some example embodiments. The network environment 100 includes a server 110, client devices 120A and 120B, and a network 150. The server 110 provides dynamic input control creation as a client-server service, provides an application to perform dynamic input control creation, or both. The client device 120A allows a user to interact with the dynamic input control creation service through a web interface 130. The client device 120B allows a user to interact with the dynamic input control creation application through an app interface 140. The server 110 and the client devices 120A and 120B may each be implemented in a computer system, in whole or in part, as described below with respect to FIG. 9.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, document-oriented NoSQL databases, a file store, or any suitable combination thereof. The database may be an in-memory database. Moreover, any two or more of the machines, databases, or devices illustrated in FIG. 1 may be combined into a single machine, and the functions described herein for any single machine, database, or device may be subdivided among multiple machines, databases, or devices.

The server 110 and the client devices 120A-120B may be connected by the network 150. The network 150 may be any network that enables communication between or among machines, databases, and devices. Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof.

Figure 2:
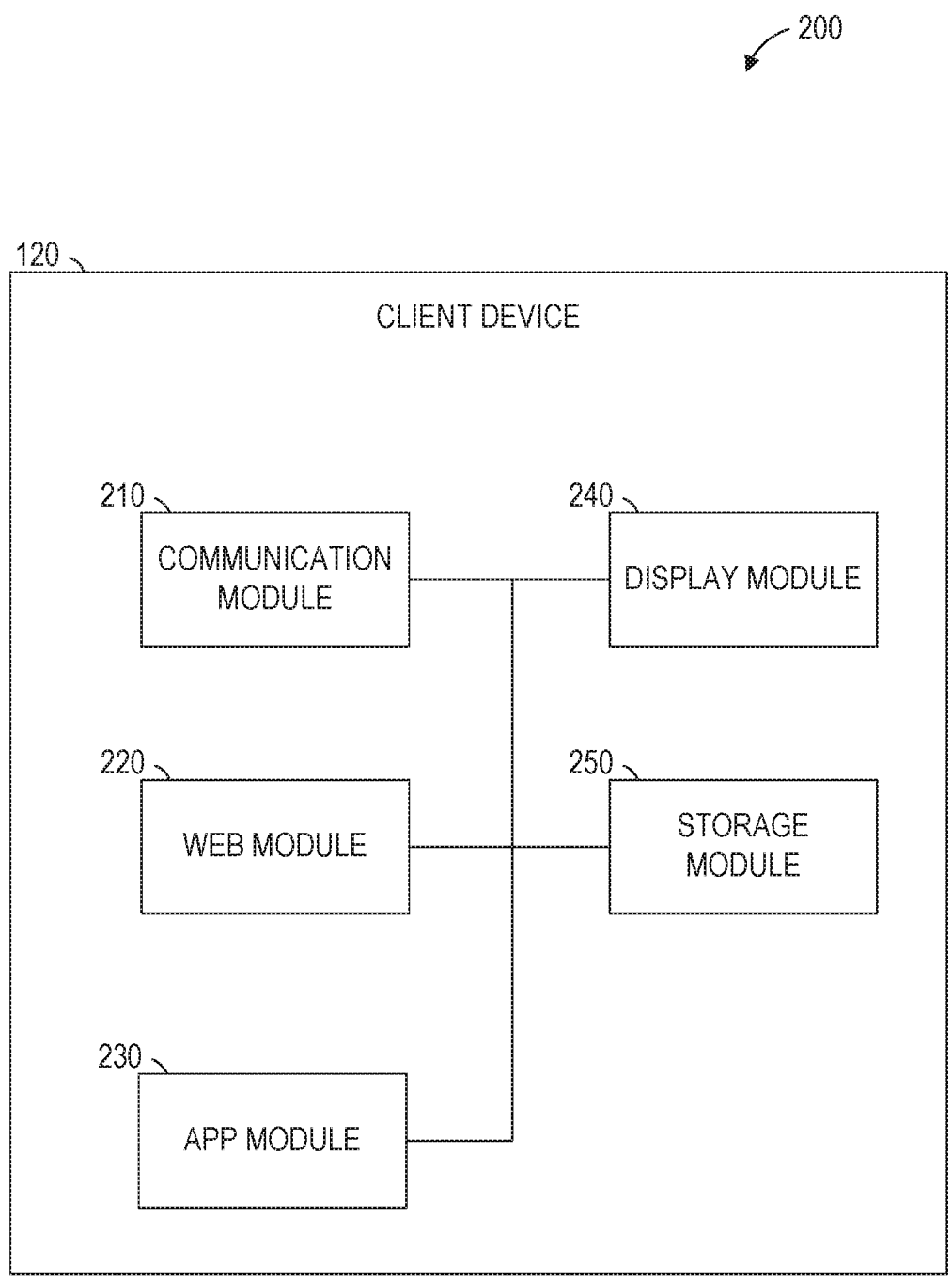
FIG. 2 is a block diagram of a client device, according to some example embodiments, suitable for implementing dynamic input control creation.

FIG. 2 is a block diagram illustrating components of a client device 120 (e.g., the client device 120A or 120B), according to some example embodiments. The client device 120 is shown as including a communication module 210, a web module 220, an app module 230, a display module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the client device 120 and transmits data from the client device 120. For example, requests for code may be sent from the client device 120 to the server 110 to retrieve Javascript code to implement dynamic input control creation. As another example, requests for data may be sent from the client device 120 to the server 110 on invocation of a filter via an input control.

The web module 220 provides a web interface to a data query application, including dynamic input controls. The web module 220 may generate hypertext transport protocol (HTTP) requests sent to the server 110 via the communication module 210, receive HTTP responses, and cause the rendering of hypertext markup language (HTML) pages via the display module 240. Additionally, the web module 220 may execute code in the browser (e.g., Javascript code) to create or handle dynamic input controls.

The app module 230 provides an application interface to a data query application, including dynamic input controls. The app module 230 may generate requests for the server 110 via the communication module 210 using an application protocol interface (API) provided by the server 110, receive responses, and cause the presentation of user interfaces and data via the display module 240. Additionally, the app module 230 may execute compiled code for the client device 120 to create or handle dynamic input controls.

The display module 240 accesses a display of the client device 120 for presentation of information to a user. For example, data received in response to a query generated via an input control may be sent to the display via the display module 240. As another example, a web interface 130 running on the client device 120A may present a browser window, user interface elements, or both, using the display module 240.

The storage module 250 stores the data used to implement one or more dynamic input controls. For example, Javascript code for the web module 220, stored filters for later transmission, data received for presentation to the user, or any suitable combination thereof may be stored by the storage module 250.

Figure 3A:
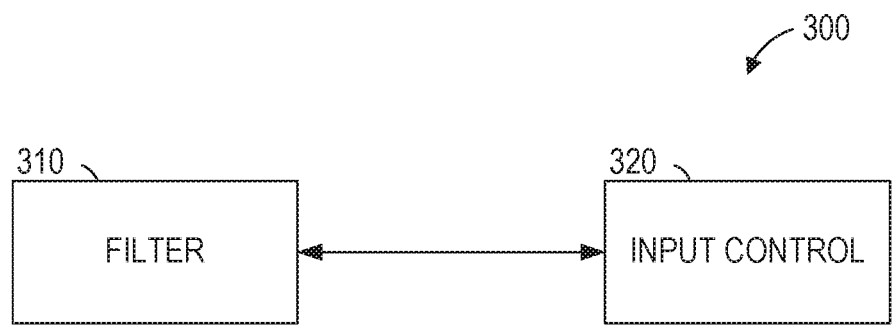
FIGS. 3A-3C are block diagrams illustrating relationships between filters and user interface elements suitable for dynamic input control creation, according to some example embodiments.
Figure 3B:
Figure 3C:

FIGS. 3A-3C are block diagrams 300 illustrating relationships between filters and user interface elements suitable for dynamic input control creation, according to some example embodiments. FIG. 3A shows a relationship between a filter 310 and an input control 320. The double-arrow connecting the filter 310 with the input control 320 shows a mutual dependence between them. For example, if a user uses the input control 320 to change the parameters of the filter (e.g., to change a selected date from Jan. 1, 2016 to Jan. 1, 2017) then the filter 310 is updated to reflect the changed parameters. As a result, data displayed to the user is modified to reflect the updated filter. In the reverse direction, if the filter parameters are changed or if the filter type is changed then the input control 320 is updated to reflect the change.

FIG. 3B shows a relationship between a filter 330 and an input control 340. In FIG. 3B, the generic filter and input control of FIG. 3A have been replaced with specific implementations. The filter 330 is a filter of dimension date. The control 340 is a date-picker control.

FIG. 3C shows a relationship between a filter 350 and an input control 360. In FIG. 3C, the filter 330 of dimension date has been changed to a filter 350 of dimension date-time. As a result, the input control 360 has been automatically changed to a date-time picker control.

FIG. 4 is a table illustrating relationships between operators and user interface elements suitable for dynamic input control creation, according to some example embodiments. The leftmost column indicates different operators for filters. For example, the first row is for a filter that matches data that has a particular value for a field (i.e., the value of the field is "equal to" the value of the filter). The remaining entries in the row indicate the types of data for which the input control of the column can be used for the operator of the row. The abbreviations used in the table are as follows: T=text, TN=text numeric, D=date, M=measure, NA=not applicable. Thus, a text box can be used as an input control for a filter when the filter operator is "equal to" and the type of the filter is text, text numeric, date, or measure. As another example, a date picker (either single value or range) cannot be used for any data type when the operator is contains or excludes, so the table indicates that those input controls are not applicable for those operators.

In the example of FIG. 4, the available input control types are text box, combo box (with radio buttons or check boxes), list box (with radio buttons or check boxes), date picker (single value or range), single slider, and double slider. In various example embodiments, more or fewer input control types are used. Other example input control types include time picker, date-time picker, spinner, toggle button, text area, rich text area, and select box.

Figure 5:
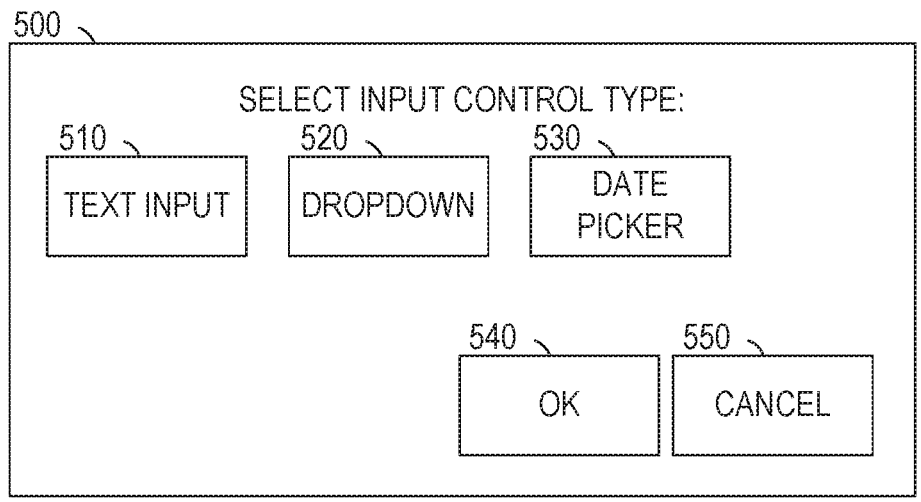
FIG. 5 is a block diagram illustrating a user interface suitable for implementing dynamic input control creation, according to some example embodiments.

FIG. 5 is a block diagram illustrating a user interface 500 suitable for implementing dynamic input control creation, according to some example embodiments. The user interface 500 includes the elements 510-550. The user interface 500 may be displayed in response to a user dragging and dropping an icon representing a filter onto a screen area for input controls for filters.

The elements 510-530 indicate different types of user controls that the user can select for use with the filter. In the example shown, the options are text input, dropdown list, and date picker. The elements 540 and 550 are operable to accept the selected input control type or cancel the operation of creating the input control, respectively.

Figure 6:
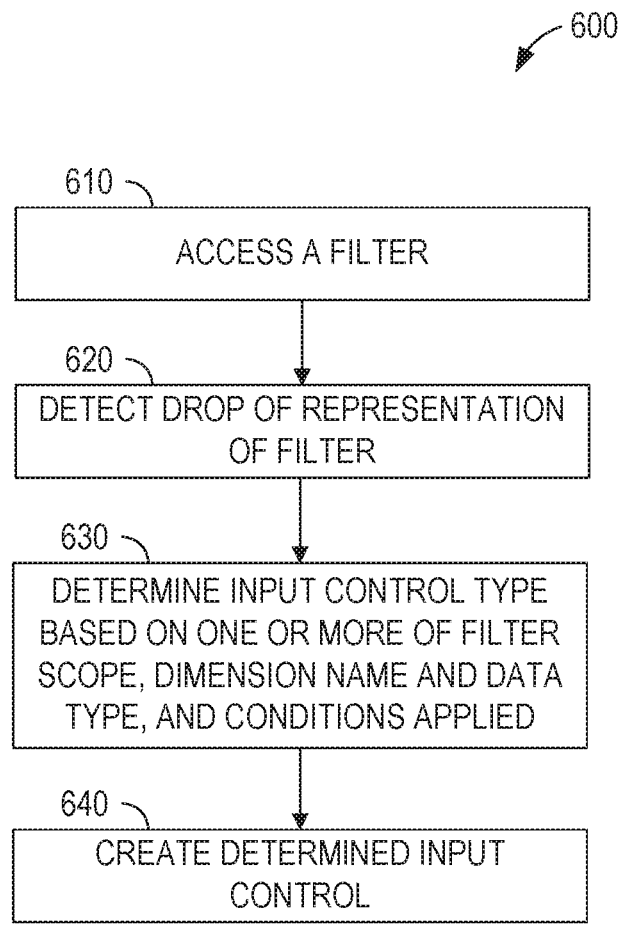
FIG. 6 is a flowchart illustrating operations, according to some example embodiments, suitable for implementing dynamic input control creation.

FIG. 6 is a flowchart illustrating operations of a method 600, according to some example embodiments, suitable for implementing dynamic input control creation. By way of example and not limitation, the method 600 is described as being performed by the devices and modules of FIGS. 1-2.

In operation 610, the web module 220 or the app module 230 accesses a filter. For example, the user may have created a stored a filter on data that causes only data with a timestamp in 2016 to be returned. In operation 620, the web module 220 or the app module 230 detects a drop of a representation of the filter in a display region. For example, icons representing user-created or predefined filters may be placed in one region of the display and the user may drag-and-drop an icon to a canvas area in which input controls are displayed.

In operation 630, the web module 220 or the app module 230 determines an input control type based on one or more of filter scope, dimension name and data type, and conditions applied. For example, using the table 400, a filter for a 2016 date range could be a text box or a date picker (range). In some example embodiments, input controls are prioritized. For example, the columns of FIG. 4 may be sorted in order of increasing priority, such that the right-most input control type will be used when multiple valid input controls are available. In such an example embodiment, the date picker (range) would be automatically generated in the example of the 2016 date range. In other example embodiments, the user is prompted to select an input control type. For example, the user interface 500 may be presented to the user.

In operation 640, the web module 220 or the app module 230 creates the determined input control. For example, a date picker may be created using JavaScript and displayed to the user in a web browser. When a date is selected with the date picker, the selected date is sent to the server 110. The server 110 responds by sending updated data based on the use of the selected date in the filter.

Figure 7:
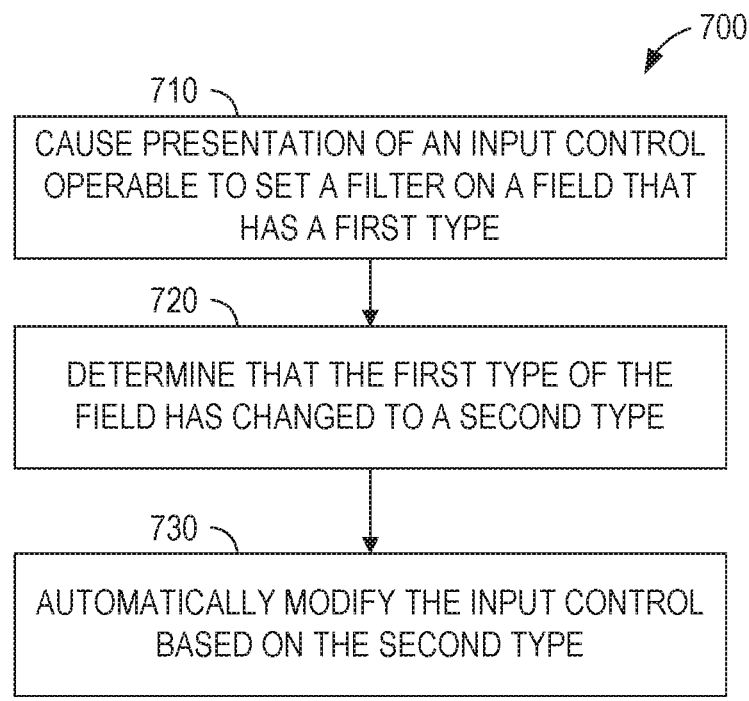
FIG. 7 is a flowchart illustrating operations, according to some example embodiments, suitable for implementing dynamic input control creation.

FIG. 7 is a flowchart illustrating operations of a method 700, according to some example embodiments, suitable for implementing dynamic input control creation. The method 700 includes operations 710-730. By way of example and not limitation, the method 700 is described as being performed by the client device 120A or 120B using the modules shown in FIG. 2.

In operation 710, the web module 220, the app module 230, or the server 110 causes presentation of an input control operable to set a filter on a field that has a first type. For example, a filter may be set on a field that contains a character string, to only return entries where the field contains a certain string (e.g., where the field "date" has a string value of "Apr. 1, 1973").

In operation 720, the web module 220, the app module 230, or the server 110 determines that the first type of the field has changed to a second type. For example, the type of the field may be changed by an administrator to a date type, storing the date in a date format rather than as a string.

In operation 730, the web module 220, the app module 230, or the server 110 automatically modifies the input control based on the second type. For example, referring to FIG. 4, a combo box is an appropriate input control for a text field with an "equal to" operator, but is not appropriate for a date field. Thus, after detecting the change of type of the field, the input control is automatically changed to a text box, a single-value date picker or a single slider.

In another example embodiment, the change detected in operation 720 is a deletion of the field instead of a change in the type of the field. As a result, the automatic modification of the input control in operation 730 is to remove the input control instead of changing the type.

Figure 8:
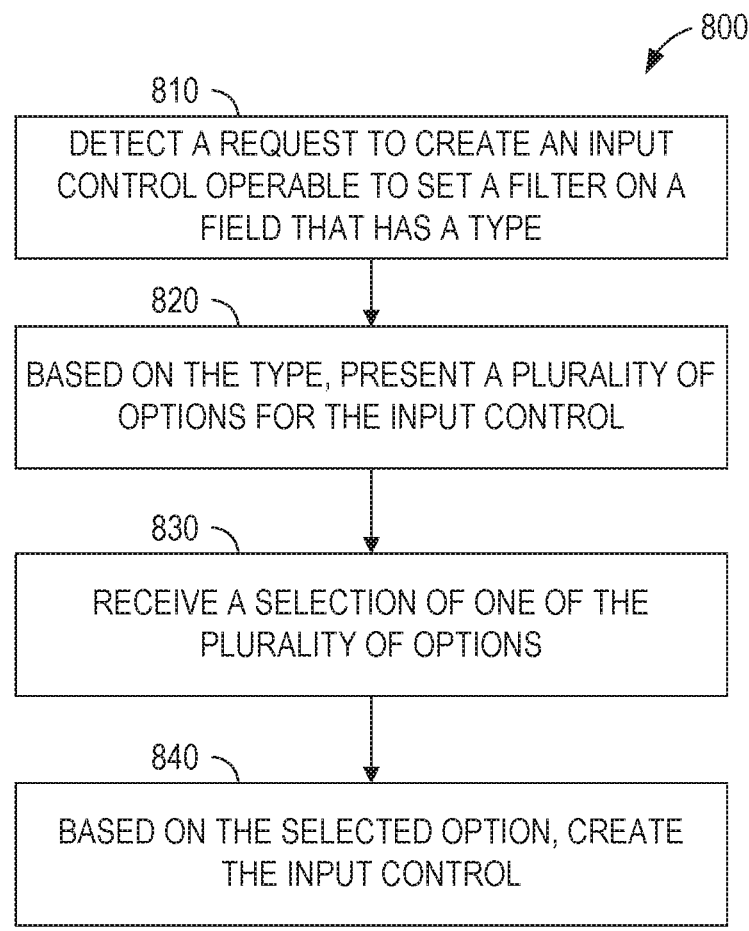
FIG. 8 is a flowchart illustrating operations, according to some example embodiments, suitable for implementing dynamic input control creation.

FIG. 8 is a flowchart illustrating operations of a method 800, according to some example embodiments, suitable for implementing dynamic input control creation. By way of example and not limitation, the method 800 is described as being performed by the client device 120A or 120B using the modules shown in FIG. 2.

In operation 810, a request is detected to create a user interface element operable to set a filter on a field that has a type. For example, the web module 220 or the app module 230 may detect that a user has dragged an icon representing a filter to a screen region for presentation of input controls. As another example, the user may bring up a context menu for the filter and select an option to create an input control for the filter. As yet another example, the request may be automatically generated at the time the user creates the filter.

In operation 820, a plurality of options for the user interface element are presented, based on the type of the field. For example, the table 400 of FIG. 4 may be accessed from a database to determine input control types appropriate for the type of the field. In some example embodiments, the options for the user interface element are further based on the operator for the filter. The user interface 500 may be presented, with appropriate customization, to allow the user to select an input control.

In operation 830, a selection of one of the plurality of options is received by the client device 120A or 120B. For example, the user may use the user interface 500 to select an input control type and press the button 540, labeled "OK."

The web module 220 or the app module 230 creates the user interface element operable to set the filter based on the selected option. For example, if the user selected a text box, a text box is created that is operable to set the value of the filter.

According to various example embodiments, one or more of the methodologies described herein may facilitate dynamic input control creation. Dynamic input control creation may reduce the time required to create an input control for a filter, prevent the creation or use of input controls of inappropriate type for the filter being controlled, or both.

When these effects are considered in aggregate, one or more of the methodologies described herein may obviate a need for certain efforts or resources that otherwise would be involved in input control creation. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 9:
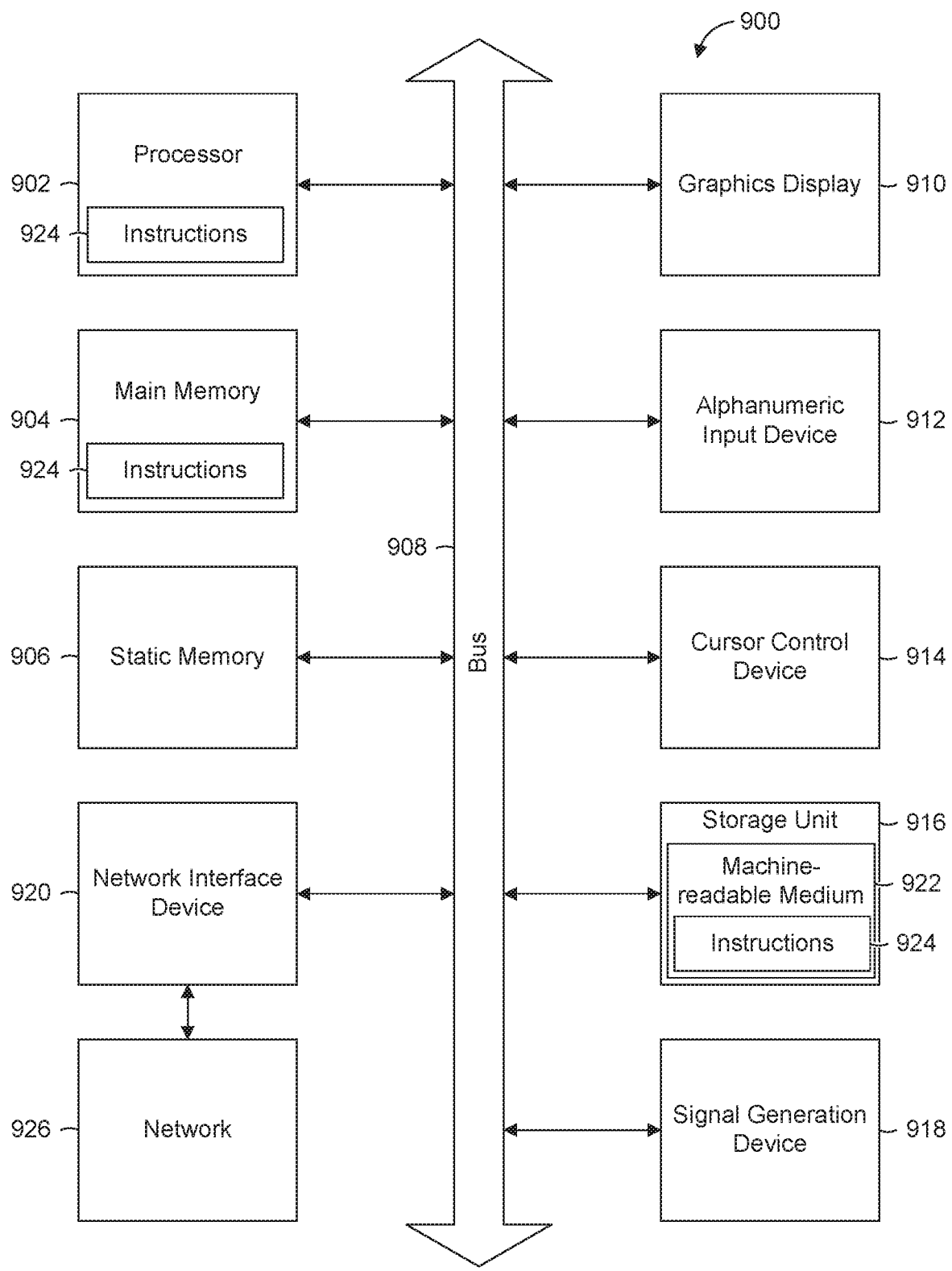
FIG. 9 is a block diagram illustrating components of a machine, according to some example embodiments.

FIG. 9 is a block diagram illustrating components of a machine 900, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed, in whole or in part. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown, in an example embodiment, to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
a memory that stores instructions;
one or more processors in communication with a network, configured by the instructions to perform operations comprising:
selecting, based on a type of a field in a database and a first operator for a first filter for the field, a first type of a first input control;
selecting, based on the type of the field in the database and a second operator for a second filter for the field, a second type of a second input control, the second operator being different from the first operator, the second type being different from the first type;
presenting the first input control operable to set the first filter on the field;
presenting first results from the database responsive to a first input received via the first input control;
presenting the second input control operable to set the second filter on the field; and
presenting second results from the database responsive to a second input received via the second input control.

2. The system of claim 1, wherein:
the type of the field is text numeric;
the first operator for the first filter for the field is an equal to operator;
the first type of the first input control is a single slider;
the second operator for the second filter for the field is a between operator; and
the second type of the second input control is a double slider.

3. The system of claim 1, wherein:
the selecting of the first type of the first input control comprises:
receiving a first selection of the field;
selecting, based on the first type of the field and the first operator, a subset of a plurality of input control types;
presenting a user interface element operable to select, from the selected input control types, a type of input control for the first filter; and
receiving a second selection of the first type of the first input control.

4. The system of claim 3, wherein the presenting of the user interface element operable to select, from the selected input control types, the first type of the first input control comprises:
presenting an option for each input control type of the selected input control types.

5. The system of claim 4, wherein at least one presented option is selected from the set consisting of a drop-down list, a combo box, a date picker, a date-time picker, a list box, a single slider, a double slider, and a text box.

6. The system of claim 1, wherein the operations further comprise:
detecting a removal of the field from the database; and
in response to the detected removal of the field from the database, ceasing to present the first input control.

7. A method comprising:
selecting, by one or more processors, based on a type of a field in a database and a first operator for a first filter for the field, a first type of a first input control;
selecting, by the one or more processors, based on the type of the field in the database and a second operator for a second filter for the field, a second type of a second input control, the second operator being different from the first operator, the second type being different from the first type;
causing, by the one or more processors, the first input control operable to set the first filter on the field to be presented on a display;
causing, by the one or more processors, first results from the database responsive to a first input received via the first input control to be presented on the display;
causing, by the one or more processors, the second input control operable to set the second filter on the field to be presented on the display; and
causing, by the one or more processors, second results from the database responsive to a second input received via the second input control to be presented on the display.

8. The method of claim 7, wherein:
the type of the field is text;
the first operator for the first filter for the field is a contains operator;
the first type of the first input control is a text box;
the second operator for the second filter for the field is an equal to operator; and
the second type of the second input control is a combo box.

9. The method of claim 7, wherein the selecting of the first type of the first input control comprises:
receiving a first selection of the field;
selecting, based on the first type of the field and the first operator, a subset of a plurality of input control types;
presenting a user interface element operable to select, from the selected input control types, a type of input control for the first filter; and
receiving a second selection of the first type of the first input control.

10. The method of claim 9, wherein the causing of the presenting of the user interface element operable to select, from the selected input control types, the first type of the first input control comprises:
causing an option for each input control type of the selected input control types to be presented on the display.

11. The method of claim 10, wherein at least one presented option is selected from the set consisting of a drop-down list, a combo box, a date picker, a date-time picker, a list box, a single slider, a double slider, and a text box.

12. The method of claim 7, further comprising:
detecting a removal of the field from the database; and
in response to the detected removal of the field from the database, ceasing to present the first input control.

13. A non-transitory machine-readable storage medium comprising instructions that, when executed by one or more processors, cause the one or more processors to perform operations comprising:
selecting, based on a type of a field in a database and a first operator for a first filter for the field, a first type of a first input control;
selecting, based on the type of the field in the database and a second operator for a second filter for the field, a second type of a second input control, the second operator being different from the first operator, the second type being different from the first type;
presenting the first input control operable to set the first filter on the field;
presenting first results from the database responsive to a first input received via the first input control;
presenting the second input control operable to set the second filter on the field; and
presenting second results from the database responsive to a second input received via the second input control.

14. The non-transitory machine-readable storage medium of claim 13, wherein:
the type of the field is date;
the first operator for the first filter for the field is an equal to operator;
the first type of the first input control is a single value date-picker;
the second operator for the second filter for the field is a between operator; and
the second type of the second input control is a range date-picker.

15. The non-transitory machine-readable storage medium of claim 13, wherein the selecting of the first type of the first input control comprises:
receiving a first selection of the field;
selecting, based on the first type of the field and the first operator, a subset of a plurality of input control types;
presenting a user interface element operable to select, from the selected input control types, a type of input control for the first filter; and
receiving a second selection of the first type of the first input control.

16. The system of claim 1, wherein the first operator for the first filter is a greater than operator and the first type of the first input control is a single slider.

17. The system of claim 1, wherein the first operator for the first filter is a contains operator and the first type of the first input control is a text box.

18. The system of claim 1, wherein the selecting of the first type of the first input control based on the type of the field in the database and the first operator for the first filter for the field comprises:
selecting a text box type of the first input control based on the type of the field being a date field and the first operator for the first filter for the field being an equal to operator.

19. The system of claim 1, wherein the selecting of the first type of the first input control based on the type of the field in the database and the first operator for the first filter for the field comprises:
selecting a combo box type of the first input control based on the type of the field being a text field and the first operator for the first filter for the field being an equal to operator.

20. The system of claim 1, wherein the selecting of the first type of the first input control based on the type of the field in the database and the first operator for the first filter for the field comprises:
selecting a list box type of the first input control based on the type of the field being a text field and the first operator for the first filter for the field being an equal to operator.

* * * * *